US012745333B1

(12) United States Patent
Wang et al.

(10) Patent No.: US 12,745,333 B1
(45) Date of Patent: Sep. 22, 2026

(54) MOTHER BULB CONTROLLER AND LIGHT STRING

(71) Applicants: Zhongshan Huwei Hardware Products Co., Ltd., Zhongshan (CN); Jiawei Wang, Bengbu (CN); Jilai Peng, Jiangmen (CN)

(72) Inventors: Jiawei Wang, Bengbu (CN); Jilai Peng, Jiangmen (CN)

(73) Assignee: Zhongshan Huwei Hardware Products Co., Ltd., Zhongshan (CN)

( * ) Notice: Subject to any disclaimer, the term of this patent is extended or adjusted under 35 U.S.C. 154(b) by 0 days.

(21) Appl. No.: 19/374,907

(22) Filed: Oct. 30, 2025

(51) Int. Cl.
*H05B 45/42* (2020.01)
*H05B 45/44* (2020.01)

(52) U.S. Cl.
CPC ............ *H05B 45/44* (2020.01); *H05B 45/42* (2020.01)

(58) Field of Classification Search
CPC ........ H05B 45/20; H05B 45/37; H05B 45/42; H05B 45/44; H05B 45/46; H05B 45/48; H05B 45/357; F21K 9/135; F21K 9/232; F21V 17/164
See application file for complete search history.

(56) References Cited

U.S. PATENT DOCUMENTS

| | | | | | |
|---|---|---|---|---|---|
| 5,726,535 | A * | 3/1998 | Yan | F21K 9/232 | 362/240 |
| 8,142,227 | B1 * | 3/2012 | Kuo | H01J 5/62 | 439/611 |
| 9,951,909 | B2 * | 4/2018 | Progl | F21K 9/232 | |
| 11,149,934 | B2 * | 10/2021 | Chen | F21V 23/006 | |
| 2011/0127918 | A1 * | 6/2011 | Chung | H05B 47/165 | 315/185 R |
| 2011/0148311 | A1 * | 6/2011 | Neuman | H05B 33/02 | 315/363 |
| 2012/0326623 | A1 * | 12/2012 | Fatt | H05B 45/00 | 439/620.21 |
| 2014/0300274 | A1 * | 10/2014 | Acatrinei | H05B 45/3578 | 315/122 |
| 2020/0229280 | A1 * | 7/2020 | Morales | H05B 45/357 | |
| 2021/0100083 | A1 * | 4/2021 | McRae | H05B 45/46 | |
| 2023/0417377 | A1 * | 12/2023 | Ren | F21K 9/237 | |

* cited by examiner

*Primary Examiner* — Tung X Le
(74) *Attorney, Agent, or Firm* — M&B IP Analysts, LLC

(57) ABSTRACT

A mother bulb controller includes a first light emitting body, a first pin, a second pin, and a control board. The control board includes a first resistor, a capacitor, and an IC controller which includes a power supply end, a ground terminal, an input end, and an output end. One end of the capacitor is electrically connected to the power supply end and another end of the capacitor is electrically connected to the ground terminal. The input end is electrically connected to one end of the first light emitting body, and another end of the first light emitting body is electrically connected to the first pin. The output end is electrically connected to the second pin. The control board is configured to turn on the first light emitting body and drive an external load to work.

17 Claims, 6 Drawing Sheets

MOTHER BULB CONTROLLER AND LIGHT STRING

TECHNICAL FIELD

The present disclosure relates to the field of light strings, and in particular, to a mother bulb controller and a light string.

BACKGROUND

In decorative lighting (such as light strings), multiple LEDs are often connected in series to simplify wiring. However, in the traditional series connection solution of light strings, an additional independent control signal line and a large drive controller are usually required to realize the synchronous function change of the master controller and the slave LEDs (such as color switching, dynamic mode). This greatly increases the complexity and cost of the light string, and because each conventional LED can only rely on the large driver controller for simple color switching, the lighting effects of the light string cannot be switched in a customized combination, resulting in a single lighting effect and poor coordination of the overall light string.

SUMMARY

The present disclosure provides a mother bulb controller and a light string.

In a first aspect of the present disclosure, an embodiment of the present disclosure provides a mother bubble controller, which includes:

- a first light emitting body emitting light with at least one color when turned on;
- a first pin connected to a power supply;
- a second pin interfacing with an external load to form a loop with the first pin; and
- a control board including a capacitor and an Integrated Circuit (IC) controller which includes an input end electrically connected to one end of the first light emitting body, a power supply end, a ground terminal, and an output end electrically connected to the second pin, where one end of the capacitor is electrically connected to the power supply end and another end of the capacitor is electrically connected to the ground terminal, and another end of the first light emitting body is electrically connected to the first pin;

where the IC controller is configured to turn on the first light emitting body and drive the external load to work.

In some embodiments, the IC controller further includes:

- a voltage stabilization unit electrically connected to the input end, and configured to stabilize an input voltage of the input end;
- a clock generation unit electrically connected to the voltage stabilization unit and, configured to output a clock frequency;
- a delay control unit electrically connected to the clock generation unit, and configured to delay the clock frequency to output a delayed clock frequency;
- a ratio control unit configured to output a ratio clock frequency;
- a frequency division unit electrically connected to the ratio control unit and the clock generation unit, respectively, and configured to divide the ratio clock frequency and the delayed clock frequency to output a frequency time; and
- a driving unit electrically connected to the frequency division unit, and configured to output a driving signal according to the frequency time to drive the external load connected to the second pin to work.

In some embodiments, the control board further includes a first resistor and a second resistor, and the IC controller further includes an expansion end. One end of the first resistor is electrically connected to the extension terminal and another end of the first resistor is electrically connected to the second pin. The first resistor is a processing component for function selection or extended application of the IC controller. The second resistor is electrically connected to two ends of the first light emitting body in parallel, and configured to adjust the operating current of the IC controller.

In some embodiments, the mother bulb controller further includes a shell which encloses the first light emitting body, the control board, the first pin, and the second pin.

In a second aspect of the present disclosure, an embodiment of the present disclosure further provides a mother bubble controller, which includes:

- a first pin connected to a power supply;
- a second pin interfacing with an external load to form a loop with the first pin;
- a control board including a capacitor and an IC controller which includes a power supply end, a ground terminal, an input end electrically connected to the first pin, and an output end electrically connected to the second pin, where one end of the capacitor is electrically connected to the power supply end, and another end of the capacitor is electrically connected to the ground terminal;

where the IC controller is configured to drive the external load to work.

In some embodiments, the IC controller further includes:

- a voltage stabilization unit electrically connected to the input end, and configured to stabilize an input voltage of the input end;
- a clock generation unit electrically connected to the voltage stabilization unit, and configured to output a clock frequency;
- a delay control unit electrically connected to the clock generation unit, and configured to delay the clock frequency to output a delayed clock frequency;
- a ratio control unit configured to output a ratio clock frequency;
- a frequency division unit electrically connected to the ratio control unit and the clock generation unit, respectively, and configured to divide the ratio clock frequency and the delayed clock frequency to output a frequency time; and
- a driving unit electrically connected to the frequency division unit, and configured to output a driving signal according to the frequency time to drive the external load connected to the second pin to work.

In some embodiments, the control board further includes a first resistor, and the IC controller further comprises an extension terminal. One end of the first resistor is electrically connected to the extension terminal, and another end of the first resistor is electrically connected to the second pin. The first resistor is a processing component for function selection or extended application of the IC controller.

In some embodiments, the mother bulb controller further includes a shell which encloses the first light emitting body, the control board, the first pin, and the second pin.

In a third aspect of the present disclosure, a light string includes at least one light emitting unit group. When the at least one light emitting unit group has a plurality of light emitting unit groups, each of the plurality of light emitting unit groups is connected in parallel. The light emitting unit groups includes the mother bulb controller of the above first aspect or the above second aspect, and at least one second light emitting body electrically connected in series to a loop formed by the first pin and the second pin of the mother bulb controller. The second light emitting body is configured to emit light with at least one color when turned on. The mother bulb controller is configured to control a conduction state of the second light emitting body. A light emitting effect of the second light emitting body changes synchronously based on a driving signal of the mother bulb controller.

In some embodiments, the light emitting unit group further includes at least a third resistor and a fourth resistor. The third resistor is electrically connected to two ends of the second light emitting body in parallel, and/or the third resistor is electrically connected to the second light emitting body in series. The third resistor is configured to adjust a working current of the second light emitting body. The fourth resistor is electrically connected in parallel between the mother bulb controller and the second light emitting body, and configured to adjust a working current of the mother bulb controller.

Other features and advantages of the present disclosure will be set forth in the following description and will in part be apparent from the description. The objectives and other advantages of the present disclosure can be realized and obtained through the structures particularly pointed out in the specification and the accompanying drawings.

BRIEF DESCRIPTION OF DRAWINGS

The accompanying drawings provides a further understanding of the technical solution of the present disclosure and constitutes a part of the specification. Together with the embodiments of the present disclosure, they explain the technical solution of the present disclosure, but does not constitute a limitation on the technical solution of the present disclosure.

The present disclosure s further described below in conjunction with the accompanying drawings and embodiments.

Figure 1:
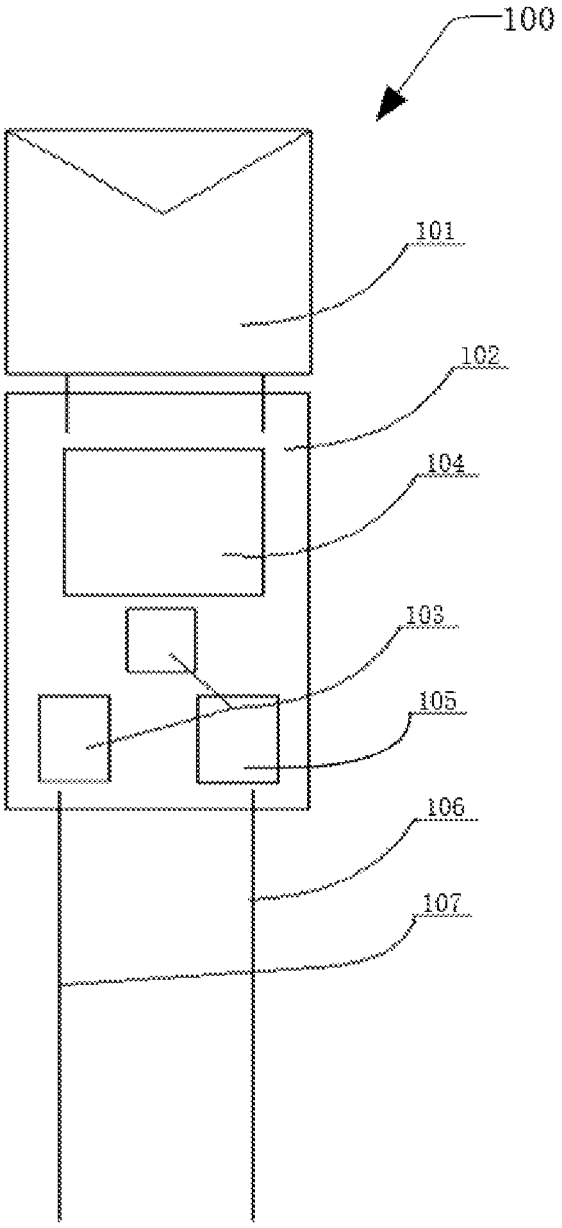
FIG. 1 is a structural diagram of a mother bubble controller according to an embodiment of the present disclosure.

Reference numerals: mother bulb controller 100, first light emitting body 101, control board 102, capacitor 103, IC controller 104, first resistor 105, first pin 106, second pin 107, second resistor 108, power supply end 109, ground terminal 110, input end 111, output end 112, expansion terminal 113, voltage stabilization unit 114, clock generation unit 115, delay control unit 116, ratio control unit 117, frequency division unit 118, driving unit 119, shell 120, isolation column 121, sleeve 122; second light emitting body 200, third resistor 210, fourth resistor 220, plug 230, and socket 240

DETAILED DESCRIPTION

This section will describe in detail the specific embodiments of the present disclosure. The preferred embodiments of the present disclosure are shown in the accompanying drawings. The purpose of the accompanying drawings is to supplement the description of the text part of the specification with graphics, such that people can intuitively and vividly understand each technical feature and the overall technical solution of the present disclosure, but it cannot be understood as a limitation on the protection scope of the present disclosure.

In the description of the present disclosure, if the first and second are described only for the purpose of distinguishing technical features, and cannot be understood as indicating or implying relative importance or implicitly indicating the number of the indicated technical features or implicitly indicating the order of the indicated technical features, it should be understood that the data used in this way can be interchangeable under appropriate circumstances, such that the embodiments of the present disclosure described herein can be implemented in an order other than those illustrated or described herein. In addition, the terms “comprises,” “comprising,” and “having,” and any variations thereof, are intended to cover non-exclusive inclusions. For example, a process, method, system, product, or apparatus that includes a series of steps or elements is not necessarily limited to those steps or elements explicitly listed, but may include other steps or elements not explicitly listed or inherent to such process, method, product, or apparatus.

In the description of the present disclosure, unless otherwise clearly defined, terms such as setting, installing, connecting, etc. should be understood in a broad sense, and technicians in the relevant technical field can reasonably determine the specific meanings of the above terms in the present disclosure based on the specific content of the technical solution.

In decorative lighting (such as light strings), multiple LED series structures are often used to simplify wiring. However, in the traditional series connection solution of light strings, an additional independent control signal line and a large drive controller are usually required to realize the synchronous function change of the main controller and the slave LEDs (such as color switching, dynamic mode). This greatly increases the complexity and cost of the light string, and because each conventional LED can only rely on the large driver controller for simple color switching, the lighting effects of the light string cannot be switched in a customized combination, resulting in a single lighting effect and poor coordination of the overall light string.

According to the embodiment of the present disclosure, a miniature mother bulb controller is connected in series with a conventional LED in a same circuit, such that the synchronous function change of the entire range of lamp beads without a signal line can be achieved through only two power supply lines, and a highly integrated, low-cost, and highly scalable collaborative lighting effect can also be achieved without new signal lines or large-scale drive controllers.

The embodiments of the present disclosure are further described below in conjunction with the accompanying drawings.

Figure 2:
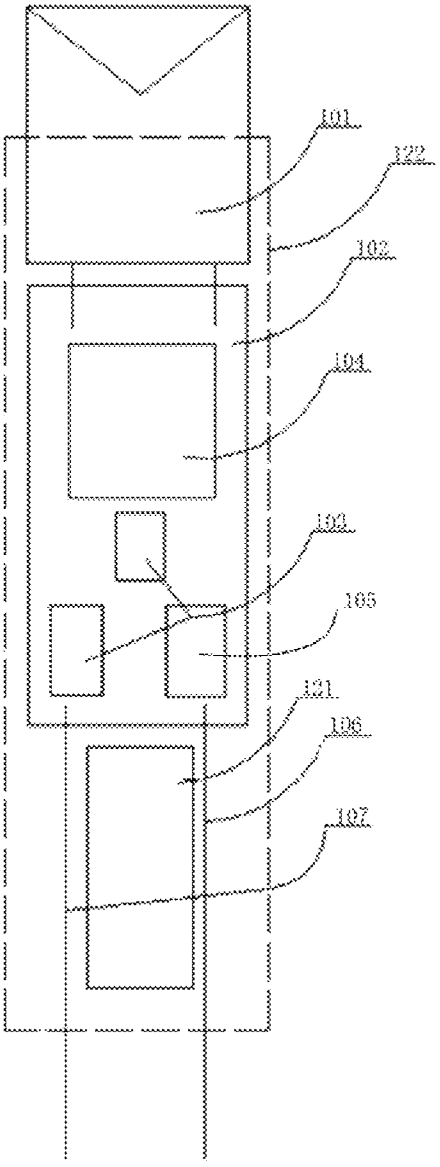
FIG. 2 is a structural diagram of another mother bubble controller according to an embodiment of the present disclosure.
Figure 3:
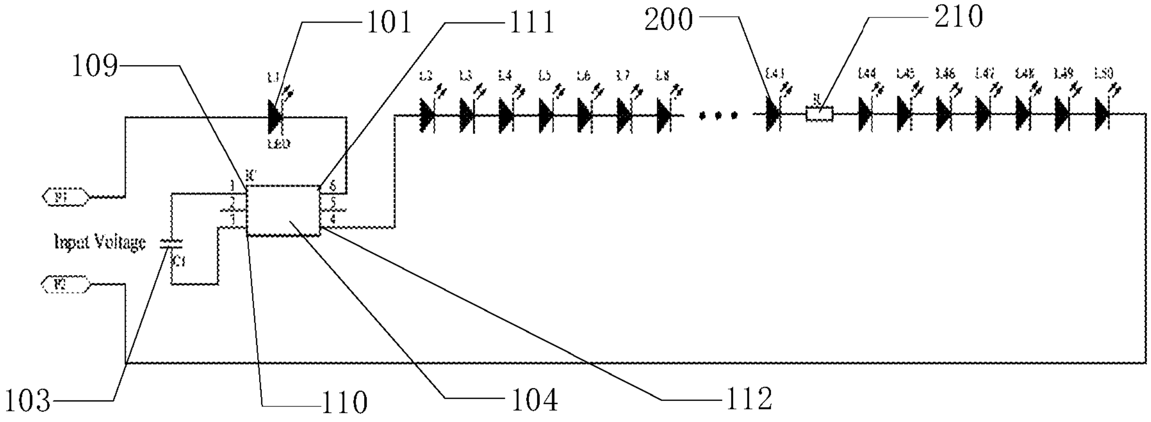
FIG. 3 is a circuit diagram of a light emitting unit group composed of a mother bulb controller and a second light emitting body connected in series according to an embodiment of the present disclosure.
Figure 4:
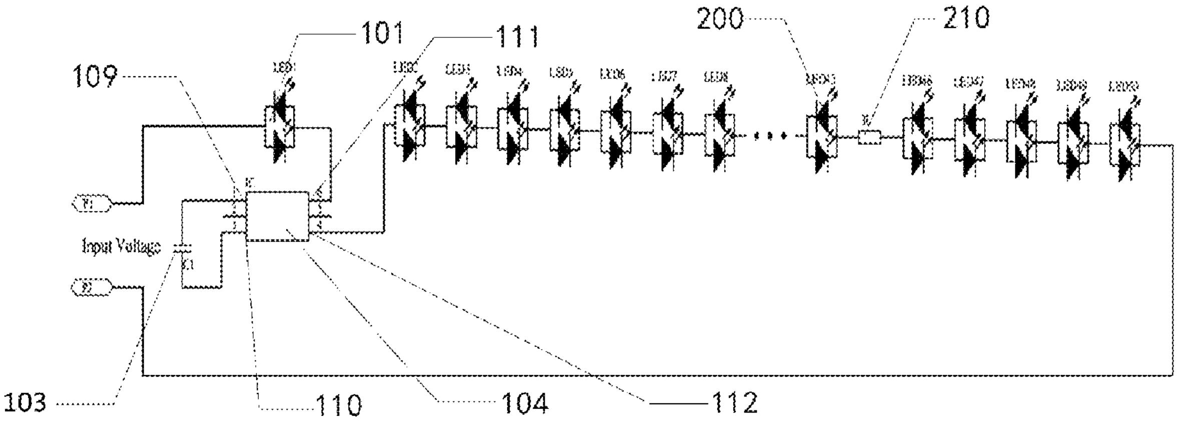
FIG. 4 is another circuit schematic diagram of a light emitting unit group composed of a mother bulb controller and a second light emitting body connected in series according to an embodiment of the present disclosure.

Referring to FIGS. 1 to 4, FIG. 1 is a structural diagram of a mother bubble controller according to an embodiment of the present disclosure, while FIG. 2 is another structural diagram of a mother bubble controller according to an embodiment of the present disclosure. FIG. 3 is a circuit schematic diagram of a light emitting unit group composed of a mother bubble controller and a second light emitting body connected in series according to an embodiment of the present disclosure, and FIG. 4 is another circuit schematic diagram of a light emitting unit group composed of a mother bubble controller and a second light emitting body connected in series according to an embodiment of the present disclosure. The mother bubble controller 100 includes a first light emitting body 101, a control board 102, a first pin 106 configured to connect to a power supply, and a second pin 107 having a connection interface for an external load to form a loop with the first pin 106.

It should be noted that the first light emitting body 101 is configured to emit light with at least one color when turned on. As can be seen from FIG. 2, a crystal grain encapsulated in the first light emitting body 101 emits light of one color when turned on. As illustrated in FIG. 3, two crystal grains are encapsulated or combined in the first light emitting body 101. In one embodiment, one of crystal grains emits light with one color when turned on, and the other crystal grain emits light with another color when turned on. Alternatively, in another embodiment, the two crystal grains emit the same color when turned on.

It should also be noted that in one embodiment, as shown in FIG. 2, in order to improve the insulation and waterproof performance of the mother bulb controller 100, the mother bulb controller 100 further has an isolation column 121 and a sleeve 122. The isolation column 121 is below the control board 102, and the sleeve 122 is sleeved with the first light emitting body 101, the control board 102, the first pin 106, and the second pin 107, thereby enabling the mother bulb controller 100 to achieve the insulation and waterproof function without a shell.

It can be concluded from FIGS. 1 to 4 that the control board 102 includes a capacitor 103 and an IC controller 104 which includes a power supply end 109, a ground terminal 110, an input end 111, and an output end 112. An end of the capacitor 103 is electrically connected to the power supply end 109, and another end of the capacitor 103 is electrically connected to the ground terminal 110. The input end 111 is electrically connected to one end of the first light emitting body 101, and another end of the first light emitting body 101 is electrically connected to the first pin 106. The output end 112 is electrically connected to the second pin 107. The control board 102 is configured to control a conduction state of the first light emitting body 101, and drive the external load connected to the second pin 107 to work.

It should be noted that in the embodiment of the present disclosure, the first pin 106 is also an interface between the current loop of the first light emitting body 101 and the external load, and the second pin 107 is independently regulated by the output end 112 of the IC controller 104, so as to support a parallel execution between the light indication of the synchronous first light emitting body 101 and the external conventional LED series load operation. In addition, the control board 102 couples a timing of the control end through the capacitor 103 to be unified with of the IC controller, such that the mother bulb controller 100 integrates the functions of light source driving, dual-channel load control, and timing maintenance. A complex dynamic lighting system can be built by connect the mother bulb controller 100 with external conventional LEDs in series. As compared with the traditional light string series connection solution, it reduces the control circuit and the large drive controller, thereby significantly reducing the manufacturing cost and failure rate.

Figure 5:
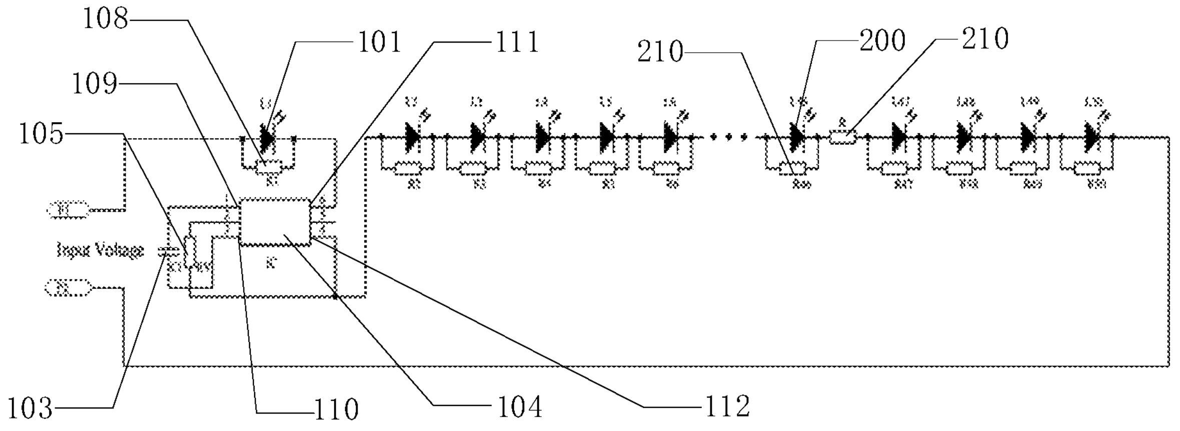
FIG. 5 is still another circuit schematic diagram of a light emitting unit group composed of a mother bulb controller and a second light emitting body connected in series according to an embodiment of the present disclosure.
Figure 6:
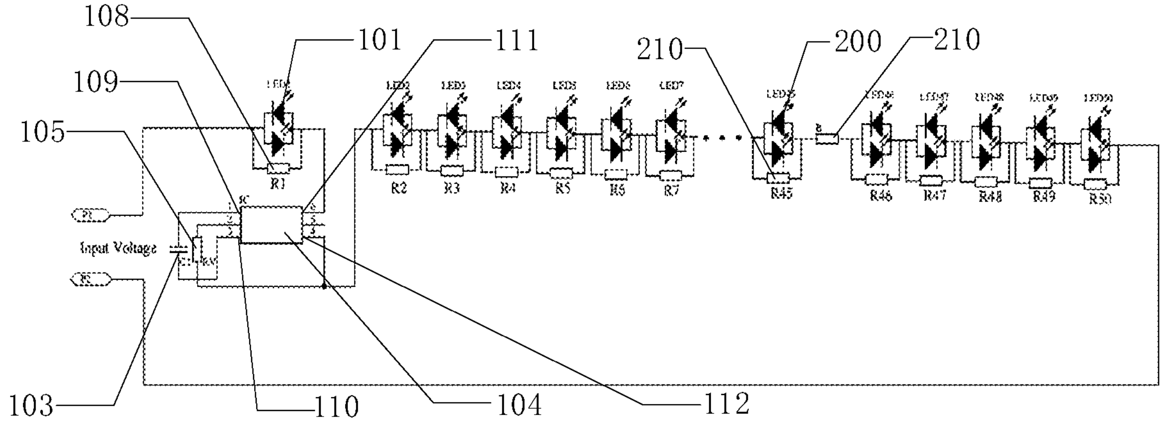
FIG. 6 is yet another circuit schematic diagram of a light emitting unit group composed of a mother bulb controller and a second light emitting body connected in series according to an embodiment of the present disclosure.

Referring to FIGS. 5 and 6, FIG. 5 is another circuit schematic diagram of a light emitting unit group composed of a mother bulb controller and a second light emitting body connected in series according to an embodiment of the present disclosure, and FIG. 6 is another circuit schematic diagram of a light emitting unit group composed of a mother bulb controller and a second light emitting body connected in series according to an embodiment of the present disclosure. The control board 102 also includes a first resistor 105 and a second resistor 108, and the IC controller 104 also includes an extension terminal 113. An end of the first resistor 105 is electrically connected to the extension terminal 113, and another end of the first resistor 105 is electrically connected to the second pin 107. The first resistor 105 is a processing component for function selection or extended application of the IC controller. The second resistor 108 is electrically connected to both ends of the first light emitting body 101 in parallel, and the second resistor 108 is configured to adjust a working current of the IC controller.

Figure 7:
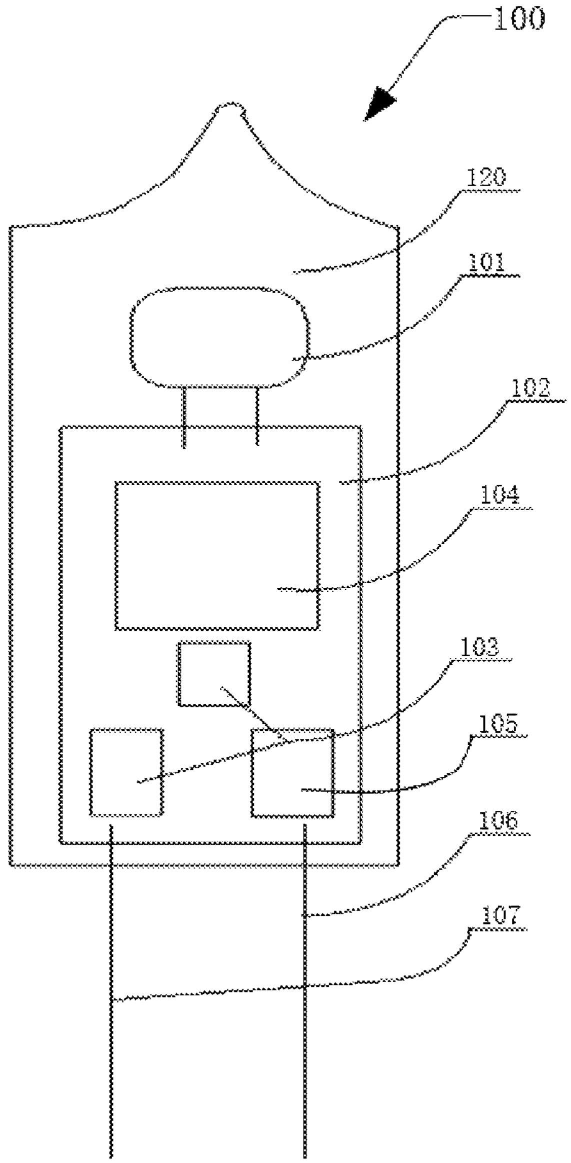
FIG. 7 is still another structural diagram of a mother bubble controller according to an embodiment of the present disclosure.

Referring to FIG. 7, FIG. 7 is another structural diagram of a mother bulb controller according to an embodiment of the present disclosure. The mother bulb controller 100 further includes a shell 120 which encloses the first light emitting body 101, the control board 102, the first pin 106, and the second pin 107.

Figure 8:
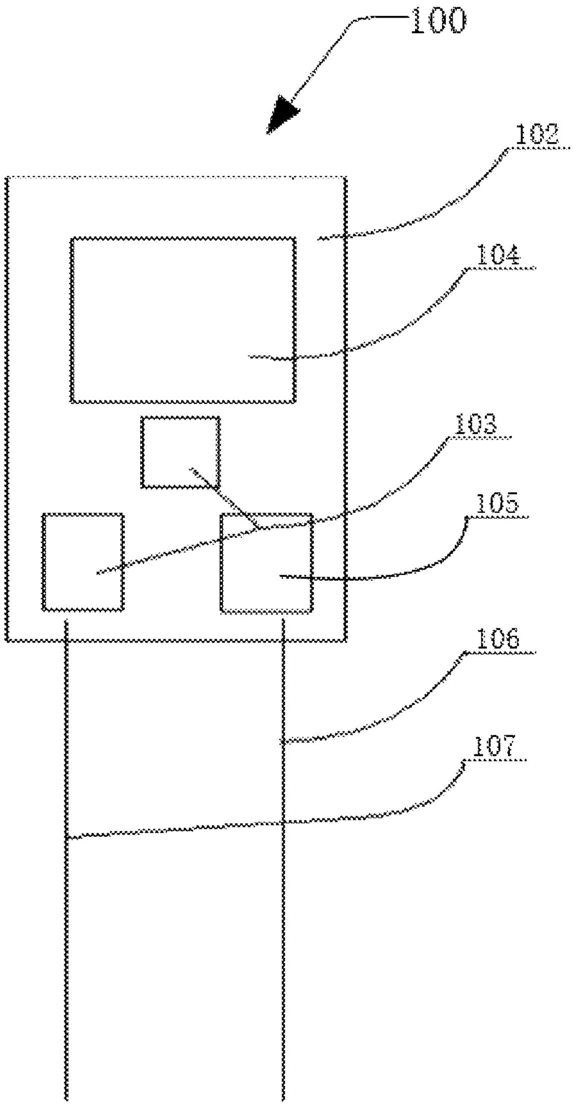
FIG. 8 is an overall structural diagram of a mother bubble controller according to some embodiments of the present disclosure.

Referring to FIG. 8, FIG. 8 is an overall structural diagram of a mother bulb controller according to some embodiments of the present disclosure. The mother bulb controller 100 has a first pin 106, a second pin 107, and a control board 102. The first pin 106 is configured to connect to a power supply, and the second pin 107 is configured to provide a connection interface for an external load to form a loop with the first pin 106. The control board 102 includes a capacitor 103 and an IC controller 104 which includes a power supply end 109, a ground terminal 110, an input end 111, and an output end 112. One end of the capacitor 103 is electrically connected to the power supply end 109, and another end of the capacitor 103 is electrically connected to the ground terminal 110. The input end 111 is electrically connected to the first pin 106, and the output end 112 is electrically connected to the second pin 107. The control board 102 is configured to drive an external load connected to the second pin 107 to work.

In the embodiment of FIG. 8, the control board 102 of the mother bubble controller 100 also includes a first resistor 105 that is the same as that in FIG. 5 and FIG. 6, and the IC controller 104 also includes an extension terminal 113. An end of the first resistor 105 is electrically connected to the extension terminal 113, and another end of the first resistor 105 is electrically connected to the second pin 107.

Figure 9:
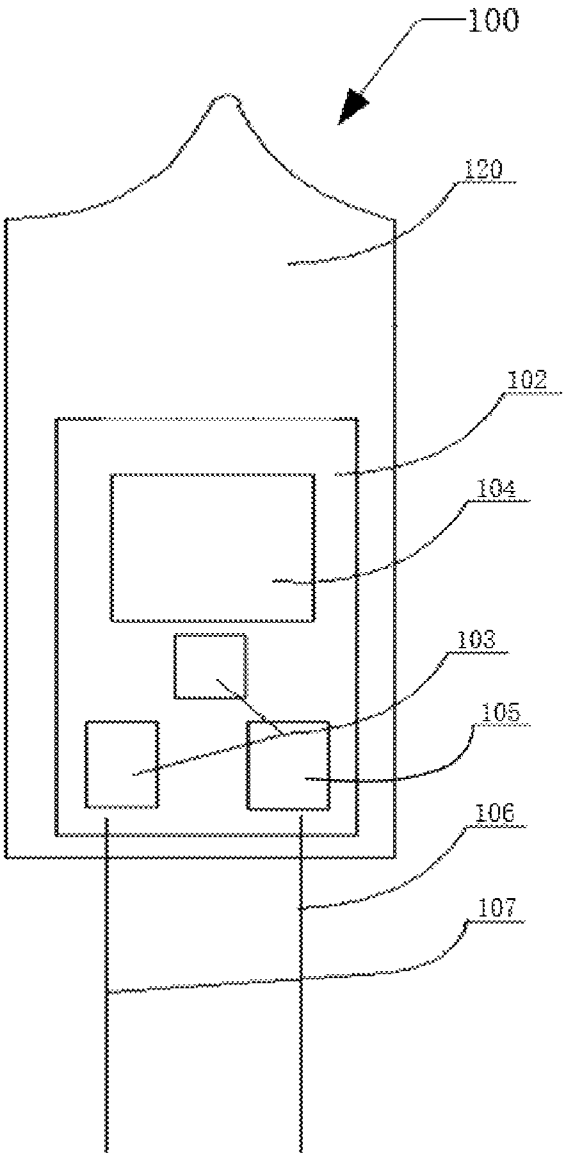
FIG. 9 is yet another structural diagram of a mother bubble controller according to an embodiment of the present disclosure.

Referring to FIG. 9, FIG. 9 is another structural diagram of a mother bulb controller 100 according to an embodiment of the present disclosure. The mother bulb controller 100 further includes a shell 120 which encloses the first light emitting body 101, the control board 102, the first pin 106, and the second pin 107.

Figure 10:
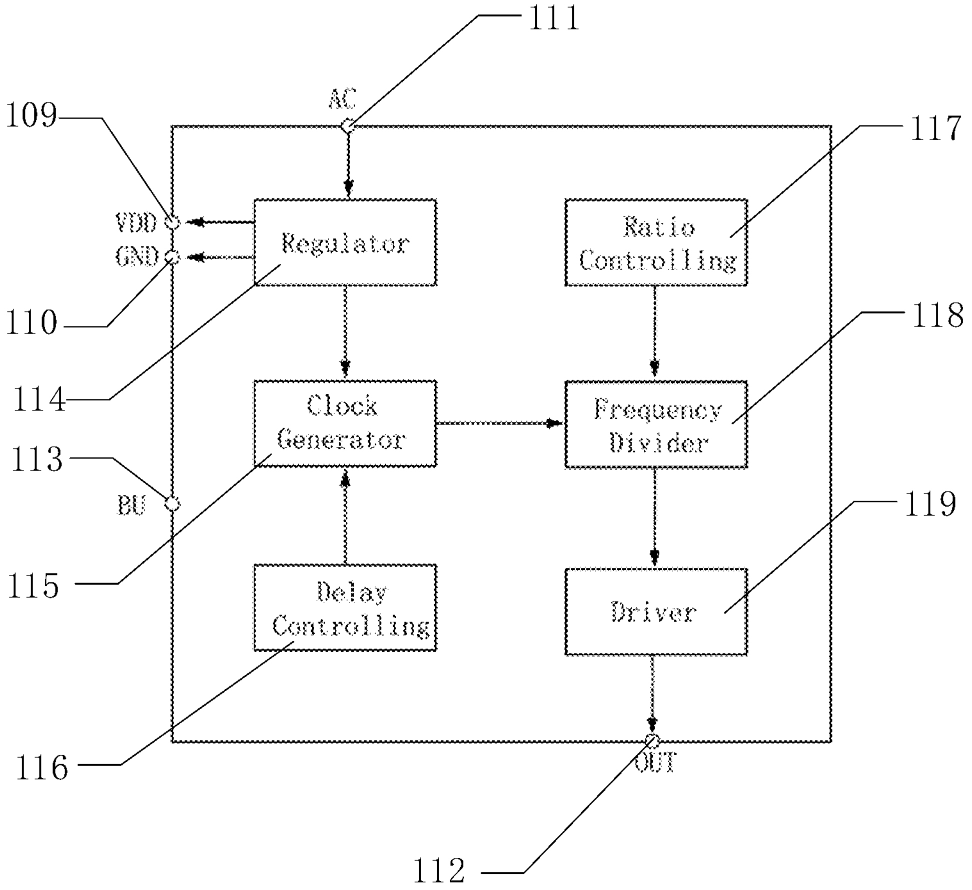
FIG. 10 is an internal structure diagram of an IC controller according to some embodiments of the present disclosure.

FIG. 10 is an internal structure diagram of the IC controller according to some embodiments of the present disclosure. The IC controller of the above embodiments also includes a voltage stabilization unit 114, a clock generation unit 115, a delay control unit 116, a ratio control unit 117, a frequency division unit 118, and a driving unit 119. The voltage stabilization unit 114 is electrically connected to an input end. The clock generation unit 115 is electrically connected to the voltage stabilization unit 114. The delay control unit 116 is electrically connected to the clock generation unit 115. The frequency division unit 118 is electrically connected to the clock generation unit 115 and the ratio control unit 117, respectively. The frequency division unit 118 is also electrically connected to the driving unit 119.

The voltage stabilization unit 114 is configured to stabilize the input voltage at the input end. The clock generation unit 115 is configured to output the clock frequency. The delay control unit 116 is configured to delay the clock frequency to output a delayed clock frequency. The ratio control unit 117 is configured to output a ratio clock frequency. The frequency division unit 118 is configured to divide the ratio clock frequency and the delayed clock frequency to output the frequency time. The driving unit 119 is configured to output a driving signal according to a frequency time to drive an external load connected to the second pin 107 to work.

It should be noted that a control principle of the IC controller is as follows: when there is an input voltage at the input end 111 of the IC controller, the voltage stabilization unit 114 stabilizes the input voltage and cooperates with the power supply end 109 and the ground terminal 110. At the same time, the voltage stabilization unit 114 also supplies power to the clock generation unit 115, the delay control unit 116, the ratio control unit 117, the frequency division unit 118, and the driving unit 119, such that each of these unit enters the working state. When the clock generation unit 115 works to generate a clock frequency, the clock frequency is delayed by the delay control unit 116 to obtain the delayed clock frequency. At the same time, the clock generation unit 115 outputs the delayed clock frequency to the frequency division unit 118, and the ratio control unit 117 generates the ratio clock frequency and outputs the ratio clock frequency to the frequency division unit 118. After receiving the ratio clock frequency and the delayed clock frequency, the frequency division unit 118 performs frequency division processing to obtain the frequency time required for driving. Then, the frequency division unit 118 outputs the frequency time to the driving unit 119 to generate a driving signal, and the driving unit 119 in turn drives the external load connected with second pin 107 (such as LED lights connected in series) work.

Figure 11:
FIG. 11 is an overall structural diagram of a light string according to some embodiments of the present disclosure.

Referring to FIG. 11, FIG. 11 is an overall structural diagram of a light string according to some embodiments of the present disclosure. The embodiment of the present disclosure provides a light string having at least one light emitting unit group. According to an embodiment of the present disclosure, a plurality of light emitting unit groups are connected in parallel with each other.

According to the above embodiment of the present disclosure, a mother bubble controller has at least the following beneficial effects. Both the first pin and the second pin are directly connected to the input end and output end of the IC controller to achieve electrical isolation and independent operation for the two loads, thereby avoiding signal crosstalk and common mode failure. In addition, the capacitor is connected across the power supply end and the ground terminal to form a timing network, thereby providing a stable clock reference for the start, stop and switching logic of the dual-channel load, and ensuring the precise execution of the complex control logic. It in turn enables the mother bulb controller to integrate the functions of dual-channel load control and timing maintenance. A complex dynamic lighting system can be built by connecting the mother bulb controller with external conventional LEDs in series. As compared with the traditional series connection solution of light strings, the control lines and the large drive controller are reduced, thereby significantly decreasing the manufacturing cost and failure rate.

It can be concluded from FIGS. 3 to 6 that the light emitting unit group includes the above-mentioned mother bulb controller 100 and at least one second light emitting body 200 which is electrically connected to the second pin 107 of the mother bulb controller 100 in series. The mother bulb controller 100 is configured to control the conduction state of the second light emitting body 200.

It should be noted that the second light emitting body 200 is configured to emit light with at least one color when turned on. It can be concluded from FIG. 2 that the second light emitting body 200 has a crystal grain which emits light with one color when turned on. It can be concluded from FIG. 3 that two crystal grains are encapsulated or combined in the second light emitting body 200. In one embodiment, one of crystal grains emits light with one color when turned on, and the other crystal grain emits light of another color when turned on. Alternatively, in another embodiment, the two crystal grains emit the same color when turned on.

In one embodiment, it can be concluded from FIGS. 2 to 3 that the light emitting unit group further includes at least one third resistor 210 which is electrically connected to the second light emitting body 200 in series. In another embodiment, it can be concluded from FIGS. 3 to 4 that the light emitting unit group also includes at least one third resistor 210 which is electrically connected to the second light emitting body 200 in series, and electrically connected to two ends of the second light emitting body 200 in parallel. The third resistor 210 is configured to adjust an operating current of the second light emitting body 200. Therefore, there are two connection relationships between the third resistor 210 and the second light emitting body 200. The third resistor 210 can be electrically connected to two ends of the second light emitting body 200 in parallel, and the third resistor 210 can also be electrically connected to the second light emitting body 200 in series, which is not specifically limited in the present disclosure.

Figure 12:
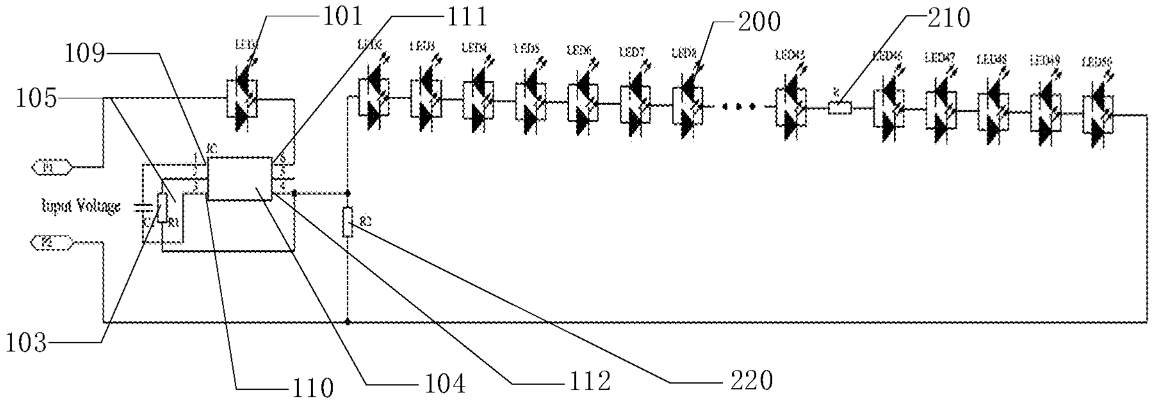
FIG. 12 is another circuit schematic diagram of a light emitting unit group consisting of a mother bulb controller and a second light emitting body connected in series, according to some embodiments of the present disclosure.

Referring to FIG. 12, FIG. 12 is another circuit schematic diagram of a light emitting unit group composed of a mother bulb controller and a second light emitting body connected in series according to some embodiments of the present disclosure. The light emitting unit group also includes a fourth resistor 220, which is electrically connected in parallel between the mother bulb controller 100 and the second light emitting body 200. The fourth resistor 220 is configured to adjust the working current of the mother bulb controller 100.

Referring to FIG. 11 again, the light string further has a plug 230 which is electrically connected to two ends of the light emitting unit group in parallel, and a socket 240 which is electrically connected to two ends of the light emitting unit group in parallel.

In a possible embodiment, flashing modes of the light string include a jumping flash mode, a breathing flash mode, a wave flash mode, a running flash mode, a gradual flash mode, and an automatic flash mode, which are not specifically limited in the present disclosure.

According to the above embodiment of the present disclosure, the light string has at least the following beneficial effects. In each unit group, the mother bulb controller is integrated with the second light emitting body in series, such that the mother bulb controller directly adjusts the conduction state (such as color/flash synchronization) of all the second light emitting bodies in the unit group to form an independently controllable lighting unit. Moreover, when multiple unit groups are connected in parallel, each mother bulb controller operates independently without interfering with each other. Users can freely increase or decrease the number of unit groups without reconstructing the control logic, thereby significantly improving the scalability and deployment flexibility of its lighting effects. When a single unit group fails, the parallel architecture automatically isolates the faulty unit group, and the remaining unit groups maintain normal operation. At the same time, the mother bulb controller in the unit group dynamically modulates the first pin output to drive the second light emitting body in series to achieve delay-free follow-up response.

It should be understood that in the present disclosure, "at least one (item)" means one or more, and "more than one" means two or more. The term "and/or" is used to describe the association relationship between related objects, indicating that there can be three relationships. For example, "A and/or B" can mean that there are three situations: only A exists, only B exists, and A and B exist at the same time, where A and B can be singular or plural. The character "/" generally indicates that the previous and next associated objects are in an "or" relationship. "At least one of the following items" or similar expressions refers to any combination of these items, including any combination of single items or plural items. For example, at least one of a, b or c can represent: a, b, c, "a and b", "a and c", "b and c", or "a and b and c", where a, b, c can be single or plural.

The embodiments of the present disclosure are described in detail above in conjunction with the accompanying drawings, but the present disclosure is not limited to the above embodiments, and various changes can be made within the knowledge scope of those of ordinary skill in the art without departing from the gist of the present disclosure.

What is claimed is:

1. A mother bubble controller, comprising:

a first light emitting body emitting light with at least one color in response to being turned on;

a first pin connected to a power supply;

a second pin interfacing with an external load to form a loop with the first pin; and a control board comprising a capacitor and an Integrated Circuit (IC) controller which comprises an input end which is electrically connected to one end of the first light emitting body, a power supply end, a ground terminal, and an output end which is electrically connected to the second pin, wherein one end of the capacitor is electrically connected to the power supply end and another end of the capacitor is electrically connected to the ground terminal, and another end of the first light emitting body is electrically connected to the first pin;

wherein the IC controller is configured to turn on the first light emitting body and drive the external load to work; and wherein the IC controller further comprises:

a voltage stabilization unit electrically connected to the input end, and configured to stabilize an input voltage of the input end;

a clock generation unit electrically connected to the voltage stabilization unit, and configured to output a clock frequency;

a delay control unit electrically connected to the clock generation unit, and configured to delay the clock frequency to output a delayed clock frequency;

a ratio control unit configured to output a ratio clock frequency;

a frequency division unit electrically connected to the ratio control unit, and the clock generation unit, respectively, and configured to divide the ratio clock frequency and the delayed clock frequency to output a frequency time; and a driving unit electrically connected to the frequency division unit, and configured to output a driving signal according to the frequency time to drive the external load connected to the second pin to work.

2. The mother bulb controller according to claim 1, further comprising a shell which encloses the first light emitting body, the control board, the first pin, and the second pin.

3. A light string, comprising:

at least one light emitting unit group, wherein in response to the at least one light emitting unit group comprising a plurality of light emitting unit groups, each of the plurality of light emitting unit groups is connected in parallel;

wherein the light emitting unit group comprises the mother bulb controller according to claim 1, and at least one second light emitting body electrically connected in series to a loop formed by the first pin and the second pin of the mother bulb controller;

wherein the second light emitting body is configured to emit light with at least one color in response to being turned on, the mother bulb controller is configured to control a conduction state of the second light emitting body, and a light emitting effect of the second light emitting body changes synchronously based on a driving signal of the mother bulb controller.

4. The light string according to claim 3, wherein the light emitting unit group further comprises at least a third resistor and a fourth resistor;

wherein the third resistor is electrically connected to two ends of the second light emitting body in parallel, and/or the third resistor is electrically connected to the second light emitting body in series, and the third resistor is configured to adjust a working current of the second light emitting body; and wherein the fourth resistor is electrically connected in parallel between the mother bulb controller and the second light emitting body, and configured to adjust a working current of the mother bulb controller.

5. The light string according to claim 3, wherein the IC controller further comprises:

a voltage stabilization unit electrically connected to the input end, and configured to stabilize an input voltage of the input end;

a clock generation unit electrically connected to the voltage stabilization unit, and configured to output a clock frequency;

a delay control unit electrically connected to the clock generation unit, and configured to delay the clock frequency to output a delayed clock frequency;

a ratio control unit configured to output a ratio clock frequency;

a frequency division unit electrically connected to the ratio control unit, and the clock generation unit, respectively, and configured to divide the ratio clock frequency and the delayed clock frequency to output a frequency time; and a driving unit electrically connected to the frequency division unit, and configured to output a driving signal according to the frequency time to drive the external load connected to the second pin to work.

6. The light string according to claim 5, further comprising a shell which encloses the first light emitting body, the control board, the first pin, and the second pin.

7. The light string according to claim 3, wherein the control board further comprises a first resistor and a second resistor, and the IC controller further comprises an expansion end;

wherein one end of the first resistor is electrically connected to the extension terminal and another end of the first resistor is electrically connected to the second pin, and the first resistor is a processing component for function selection or extended application of the IC controller; and wherein the second resistor is electrically connected to two ends of the first light emitting body in parallel, and configured to adjust the operating current of the IC controller.

8. A mother bubble controller, comprising:

a first light emitting body emitting light with at least one color in response to being turned on;

a first pin connected to a power supply;

a second pin interfacing with an external load to form a loop with the first pin; and a control board comprising a capacitor and an Integrated Circuit (IC) controller which comprises an input end which is electrically connected to one end of the first light emitting body, a power supply end, a ground terminal, and an output end which is electrically connected to the second pin, wherein one end of the capacitor is electrically connected to the power supply end and another end of the capacitor is electrically connected to the ground terminal, and another end of the first light emitting body is electrically connected to the first pin;

wherein the IC controller is configured to turn on the first light emitting body and drive the external load to work;

wherein the control board further comprises a first resistor and a second resistor, and the IC controller further comprises an expansion end;

wherein one end of the first resistor is electrically connected to the extension terminal and another end of the first resistor is electrically connected to the second pin, and the first resistor is a processing component for function selection or extended application of the IC controller; and wherein the second resistor is electrically connected to two ends of the first light emitting body in parallel, and configured to adjust the operating current of the IC controller.

9. A light string, comprising:

at least one light emitting unit group, wherein in response to the at least one light emitting unit group comprising a plurality of light emitting unit groups, each of the plurality of light emitting unit groups is connected in parallel;

wherein the light emitting unit group comprises the mother bulb controller according to claim 3, and at least one second light emitting body electrically connected in series to a loop formed by the first pin and the second pin of the mother bulb controller;

wherein the second light emitting body is configured to emit light with at least one color in response to being turned on, the mother bulb controller is configured to control a conduction state of the second light emitting body, and a light emitting effect of the second light emitting body changes synchronously based on a driving signal of the mother bulb controller.

10. A mother bubble controller, comprising:

a first pin connected to a power supply;

a second pin interfacing with an external load to form a loop with the first pin;

a control board comprising a capacitor and an IC controller which comprises a power supply end, a ground terminal, an input end electrically connected to the first pin, and an output end electrically connected to the second pin, wherein one end of the capacitor is electrically connected to the power supply end, and another end of the capacitor is electrically connected to the ground terminal;

wherein the IC controller is configured to drive the external load to work;

wherein the IC controller further comprises:

a voltage stabilization unit electrically connected to the input end, and configured to stabilize an input voltage of the input end;

a clock generation unit electrically connected to the voltage stabilization unit, and configured to output a clock frequency;

a delay control unit electrically connected to the clock generation unit, and configured to delay the clock frequency to output a delayed clock frequency;

a ratio control unit configured to output a ratio clock frequency;

a frequency division unit electrically connected to the ratio control unit and the clock generation unit, respectively, and configured to divide the ratio clock frequency and the delayed clock frequency to output a frequency time; and a driving unit electrically connected to the frequency division unit, and configured to output a driving signal according to the frequency time to drive the external load connected to the second pin to work.

11. The mother bulb controller according to claim 10, wherein the control board further comprises a first resistor, the IC controller further comprises an extension terminal, one end of the first resistor is electrically connected to the extension terminal and another end of the first resistor is electrically connected to the second pin, and the first resistor is a processing component for function selection or extended application of the IC controller.

12. The mother bulb controller according to claim 10, further comprising a shell which encloses the first light emitting body, the control board, the first pin, and the second pin.

13. A light string, comprising:

at least one light emitting unit group, wherein in response to the at least one light emitting unit group comprising a plurality of light emitting unit groups, each of the plurality of light emitting unit groups is connected in parallel;

wherein the light emitting unit group comprises the mother bulb controller according to claim 5, and at least one second light emitting body electrically connected in series to a loop formed by the first pin and the second pin of the mother bulb controller;

wherein the second light emitting body is configured to emit light with at least one color in response to being turned on, the mother bulb controller is configured to control a conduction state of the second light emitting body, and a light emitting effect of the second light emitting body changes synchronously based on a driving signal of the mother bulb controller.

14. The light string according to claim 13, wherein the light emitting unit group further comprises at least a third resistor and a fourth resistor;

wherein the third resistor is electrically connected to two ends of the second light emitting body in parallel, and/or the third resistor is electrically connected to the second light emitting body in series, and the third resistor is configured to adjust a working current of the second light emitting body; and wherein the fourth resistor is electrically connected in parallel between the mother bulb controller and the second light emitting body, and configured to adjust a working current of the mother bulb controller.

15. The light string according to claim 13, wherein the IC controller further comprises:

a voltage stabilization unit electrically connected to the input end, and configured to stabilize an input voltage of the input end;

a clock generation unit electrically connected to the voltage stabilization unit, and configured to output a clock frequency;

a delay control unit electrically connected to the clock generation unit, and configured to delay the clock frequency to output a delayed clock frequency;

a ratio control unit configured to output a ratio clock frequency;

a frequency division unit electrically connected to the ratio control unit, and the clock generation unit, respectively, and configured to divide the ratio clock frequency and the delayed clock frequency to output a frequency time; and a driving unit electrically connected to the frequency division unit, and configured to output a driving signal according to the frequency time to drive the external load connected to the second pin to work.

16. The light string according to claim 15, further comprising a shell which encloses the first light emitting body, the control board, the first pin, and the second pin.

17. The light string according to claim 13, wherein the control board further comprises a first resistor and a second resistor, and the IC controller further comprises an expansion end;

wherein one end of the first resistor is electrically connected to the extension terminal and another end of the first resistor is electrically connected to the second pin, and the first resistor is a processing component for function selection or extended application of the IC controller; and wherein the second resistor is electrically connected to two ends of the first light emitting body in parallel, and configured to adjust the operating current of the IC controller.

* * * * *